(12) United States Patent
Mourlam

(10) Patent No.: US 10,124,773 B1
(45) Date of Patent: Nov. 13, 2018

(54) CHASSIS-STABILIZING SYSTEM

(71) Applicant: Altec Industries, Inc., Birmingham, AL (US)

(72) Inventor: Timothy J. Mourlam, Kansas City, KS (US)

(73) Assignee: Altec Industries, Inc., Birmingham, AL (US)

( * ) Notice: Subject to any disclaimer, the term of this patent is extended or adjusted under 35 U.S.C. 154(b) by 0 days.

(21) Appl. No.: 15/852,024

(22) Filed: Dec. 22, 2017

(51) Int. Cl.
| | |
|---|---|
| *B60S 9/10* | (2006.01) |
| *B60S 9/12* | (2006.01) |
| *B66F 11/00* | (2006.01) |
| *B66F 11/04* | (2006.01) |
| *B66C 23/80* | (2006.01) |

(52) U.S. Cl.
CPC . *B60S 9/10* (2013.01); *B60S 9/12* (2013.01); *B66C 23/80* (2013.01); *B66F 11/00* (2013.01); *B66F 11/044* (2013.01)

(58) Field of Classification Search
CPC .... B60S 9/10; B60S 9/12; B66F 11/00; B66F 11/044; B66C 23/80
See application file for complete search history.

(56) References Cited

U.S. PATENT DOCUMENTS

| | | | | |
|---|---|---|---|---|
| 3,713,129 | A | 1/1973 | Buchholz | |
| 5,258,913 | A * | 11/1993 | Balauf | B66C 23/80 280/766.1 |
| 5,580,095 | A * | 12/1996 | Fukumoto | B60S 9/12 280/766.1 |
| 6,619,693 | B1 * | 9/2003 | Sproatt et al. | B60S 9/12 280/764.1 |
| 7,226,057 | B2 * | 6/2007 | Eichhorn et al. | B60S 9/12 280/6.153 |
| 2010/0230370 | A1 | 9/2010 | Schneider et al. | |
| 2011/0031202 | A1 | 2/2011 | Pech et al. | |
| 2017/0291805 | A1 * | 10/2017 | Hao et al. | B66F 11/044 |

* cited by examiner

*Primary Examiner* — Dale W Hilgendorf
(74) *Attorney, Agent, or Firm* — Erise IP, P.A.

(57) ABSTRACT

A chassis-stabilization system is shown and described that promotes chassis stability over chassis leveling. The chassis-stabilization system equalizes, or more equalizes, the loads on the chassis. This is because uneven loads can cause the chassis (and by extension the entire utility vehicle) to overturn. The chassis-stabilizing system may include a first pressure transducer, a second pressure transducer, a level sensor, and a controller. The controller is configured to receive a first initial reading from the first pressure transducer and a second initial reading from the second pressure transducer; determine an initial pressure profile based at least in part on the first initial reading and the second initial reading; compare the initial pressure profile to a known level profile; and instruct the first actuator to actuate so as to adjust the initial pressure profile to proportionally nearer to the known level profile.

18 Claims, 8 Drawing Sheets

CHASSIS-STABILIZING SYSTEM

RELATED APPLICATIONS

Embodiments and/or features of the invention described in the present document may be used with the subject matter disclosed in commonly assigned and concurrently filed U.S. patent application Ser. No. 15/851,930, filed Dec. 22, 2017, and entitled "BOOM LOAD MONITORING." The concurrently filed patent application is hereby incorporated by reference in its entirety into the present application.

BACKGROUND

1. Field

Embodiments of the invention relate to the utility vehicles and the stabilization thereof. More specifically, embodiments of the invention relate to a chassis-stabilizing system.

2. Related Art

Utility workers utilize aerial devices, cranes, and other utility vehicles to perform numerous tasks. Utility vehicles typically include a boom assembly that aids in performing the task. In the case of an aerial device, the boom assembly supports a utility platform in which one or more utility workers stand. In the case of a crane, the boom assembly lifts and moves heavy loads. In these and other scenarios, a stable utility vehicle is of importance to prevent the tipping or collapse.

Typically, to prevent a tipping of the utility vehicle, the utility vehicle is leveled prior to the beginning of a task. The leveling is performed by ensuring that the chassis of the vehicle is stable. However, conditions in the field can vary widely such that fully level may not be the most stable arrangement in many circumstances.

SUMMARY

Embodiments of the invention solve the above-mentioned problems by providing a chassis-stabilization system that promotes chassis stability over chassis leveling. In some embodiments, the system will ensure it remains under a level threshold. The chassis-stabilization system equalizes, or more equalizes, the loads on the chassis. This is because uneven loads can cause the chassis (and by extension the entire utility vehicle) to overturn.

A first embodiment of the invention is directed to a chassis-stabilizing system comprising a first actuator, a second actuator, and a controller. The first actuator is associated with a first pressure transducer and is configured to move a first outrigger of a chassis. The second actuator is associated with a second pressure transducer and is configured to move a second outrigger of the chassis. The controller is configured to receive a first initial reading from the first pressure transducer and a second initial reading from the second pressure transducer; determine an initial pressure profile based at least in part on the first initial reading and the second initial reading; compare the initial pressure profile to a known level profile; and instruct the first actuator to actuate so as to adjust the initial pressure profile to proportionally nearer to the known level profile.

A second embodiment of the invention is directed to a chassis-stabilizing system comprising a first pressure transducer, a second pressure transducer, and a controller. The first pressure transducer is associated with a first actuator, which is configured to move a first outrigger of a chassis. The second pressure transducer associated with a second actuator, which is configured to move a second outrigger of the chassis. The controller is configured to receive a first initial reading from the first pressure transducer and a second initial reading from the second pressure transducer; determine an initial pressure profile based at least in part on the first initial reading and the second initial reading; compare the initial pressure profile to a known level profile; instruct the first actuator to actuate so as to adjust the initial pressure profile to proportionally nearer to the known level profile; receive a first adjusted reading from the first pressure transducer; determine an adjusted pressure profile based at least in part on the first adjusted reading; and compare the adjusted pressure profile to the known level profile to determine that the adjusted pressure profile is nearer to the known level profile than the initial pressure profile.

A third embodiment of the invention is directed to a chassis-stabilizing system comprising a first pressure transducer, a second pressure transducer, a level sensor, and a controller. The first pressure transducer is associated with a first actuator, which is configured to move a first outrigger of a chassis. The second pressure transducer associated with a second actuator, which is configured to move a second outrigger of the chassis. The controller configured to receive a first initial reading from the first pressure transducer and a second initial reading from the second pressure transducer; determine an initial pressure profile based at least in part on the first initial reading and the second initial reading; compare the initial pressure profile to a known level profile; instruct the first actuator to actuate so as to adjust the initial pressure profile to proportionally nearer to the known level profile; acquire, from the level sensor, an adjusted true level indication associated with the adjusted pressure profile; and determine whether the adjusted true level indication is above a true level threshold.

Additional embodiments of the invention are directed to a method of installing the chassis-stabilizing system, a method of assembling the chassis-stabilizing system, a method of stabilizing a chassis, a method of deploying and stowing the outriggers, or other such methods. Still other embodiments of the invention may be directed to a utility vehicle comprising a base, a boom assembly, and a chassis-stabilizing system as described above.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
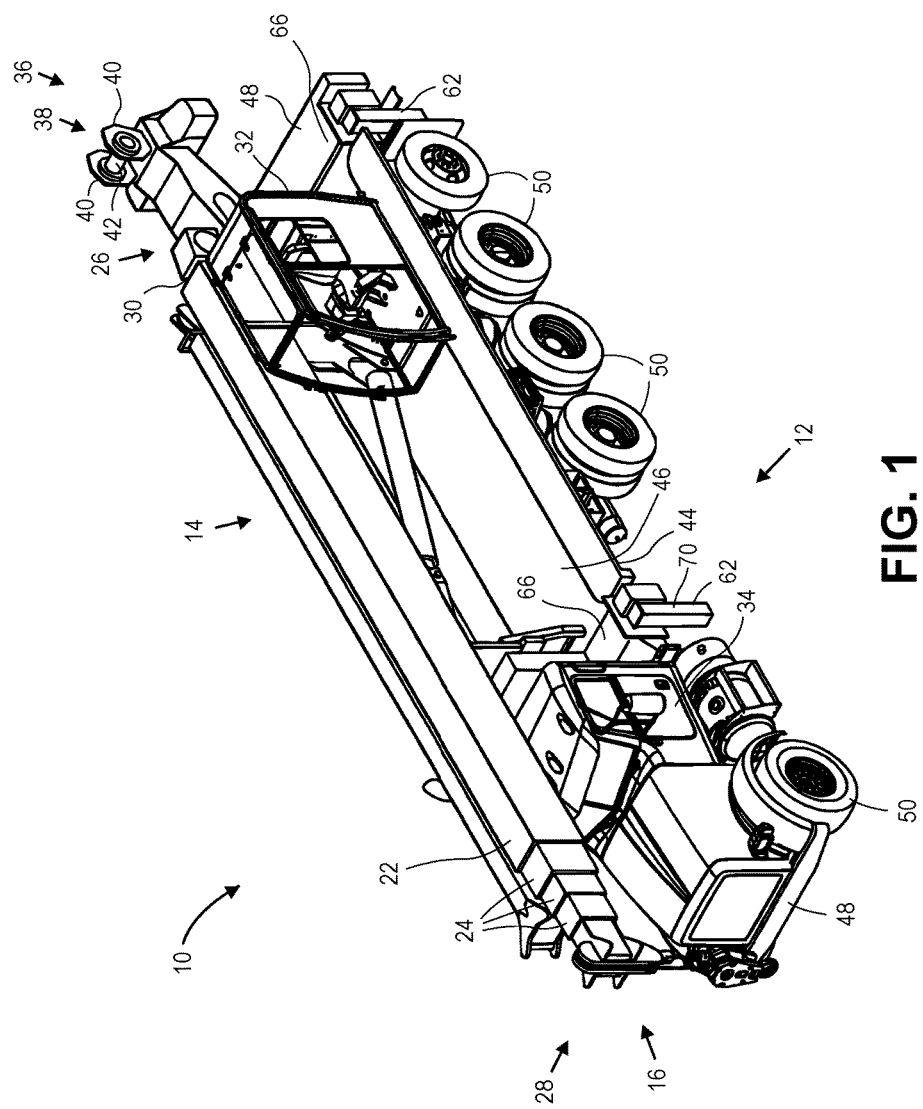
FIG. 1 is a perspective view of a utility vehicle with a set of outriggers in a stowed position, shown from a front left orientation.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

A utility vehicle 10 constructed in accordance with various embodiments of the invention, is shown in FIG. 1. The utility vehicle 10 generally comprises a base 12 with a boom assembly 14 rotatably mounted thereto. An implement 16 (such as a winch hook, a digger derrick, a pole guide, a utility platform, or other tool) is disposed on the boom assembly 14 to provide for the accomplishment of a task by a utility worker. The base is stabilized by a set of outriggers 18. The set of outriggers 18 is controlled by a chassis-stabilizing system 20 that is configured to move the base 12 away from a true level toward a force equalized configuration, as long as the base 12 remains under a true level threshold (as discussed in much more detail below).

Before discussing the chassis-stabilizing system 20 in detail, the other components of the utility vehicle 10 will be discussed so as to orient the reader as to a particular exemplary embodiment of the invention. It should also be appreciated that some embodiments of the invention are configured to be used on or with other devices. The boom assembly 14 broadly comprises an outer boom section 22 and at least one inner boom section 24. The boom assembly 14 presents a proximal end 26 and a distal end 28. The proximal end 26 is rotatably and/or pivotably secured to a boom turret 30 of the base 12.

Figure 2:
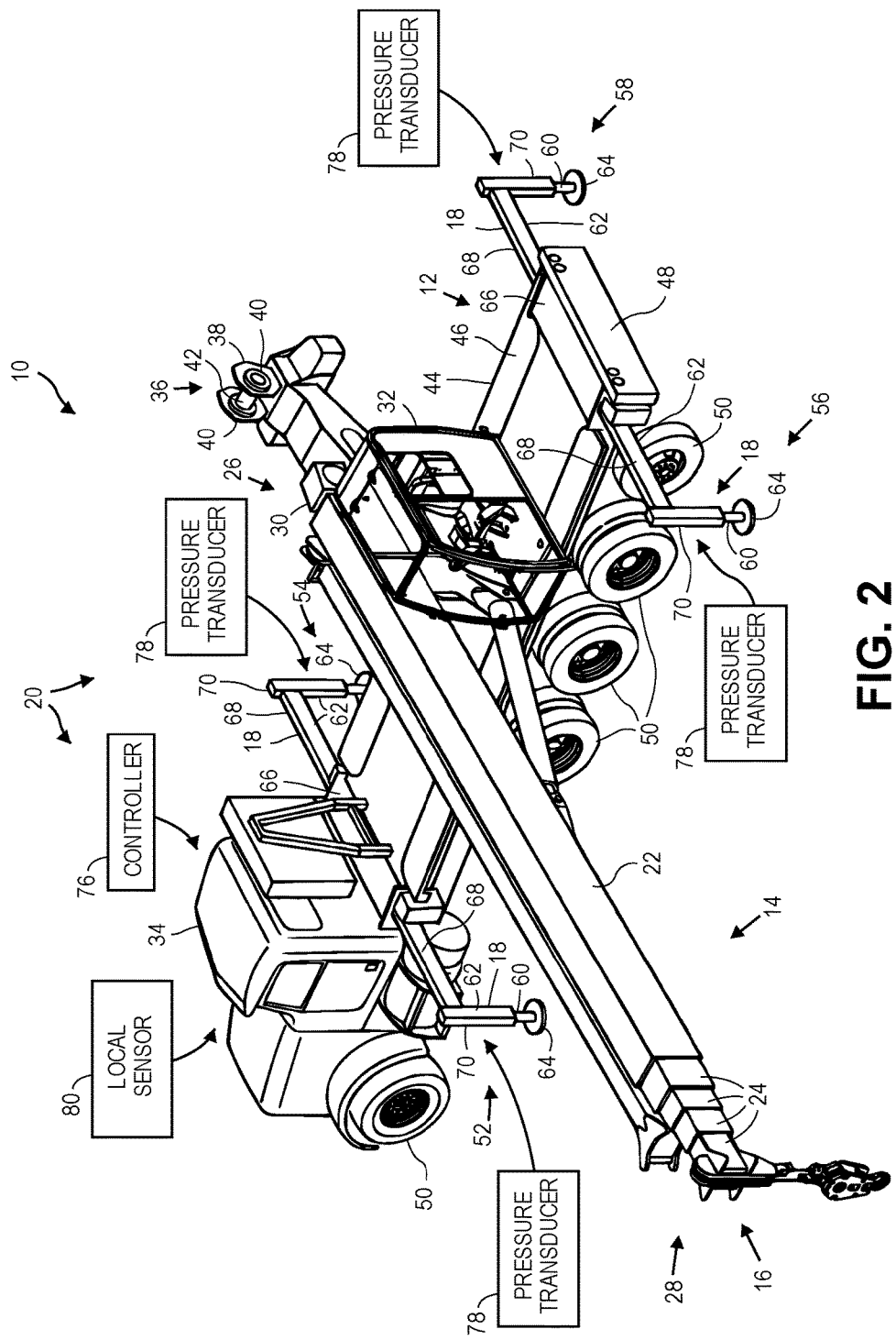
FIG. 2 is a perspective view of the utility vehicle of FIG. 1, shown with the set of outriggers in a deployed position and shown from a rear left orientation.
Figure 3:
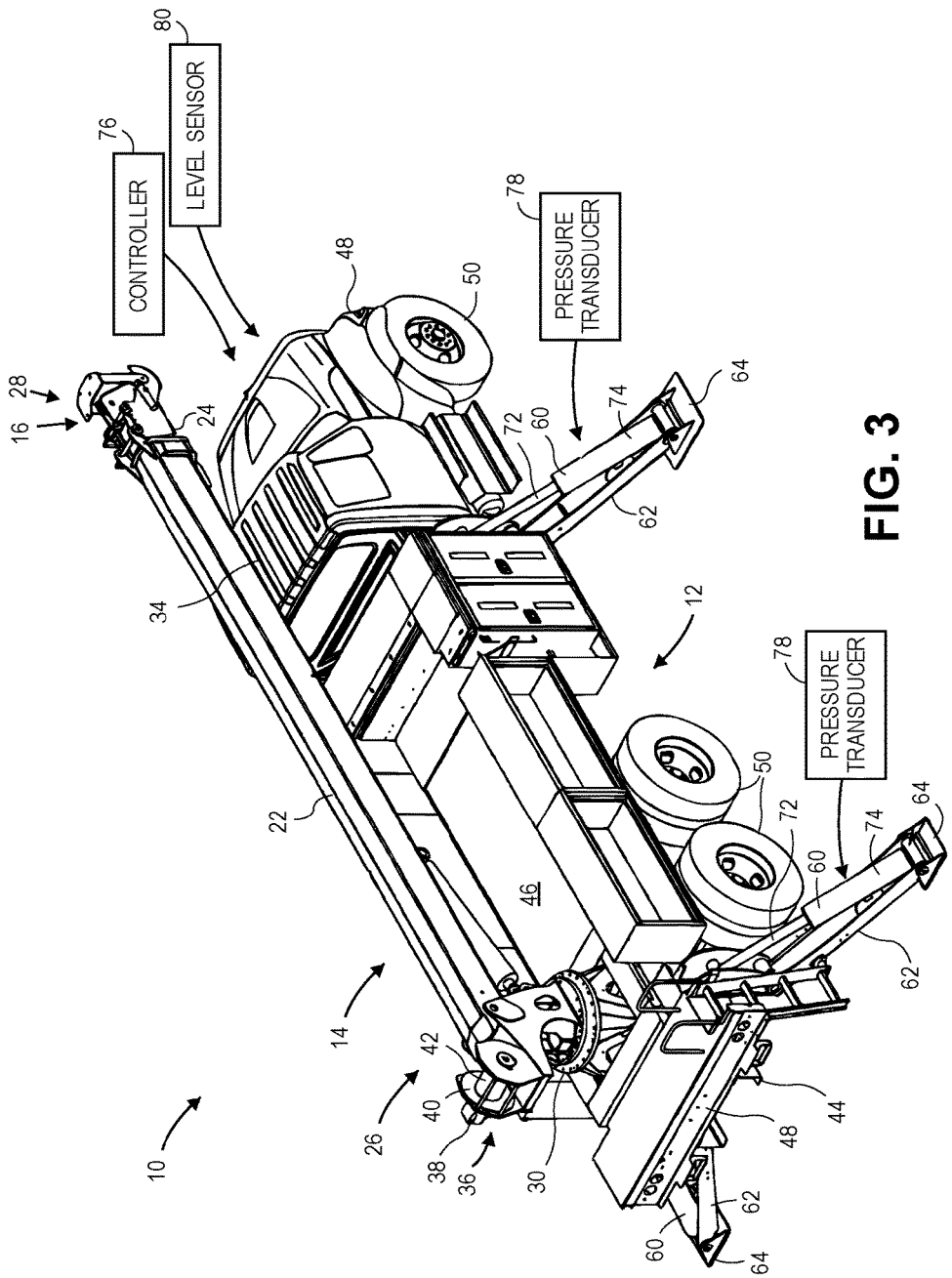
FIG. 3 is a perspective view of a utility vehicle, shown with a set of radial outriggers in the deployed.

The proximal end 26 and/or the boom turret 30 may also have an associated static-operations cab 32 (as illustrated in FIGS. 1 and 2, but not present in FIG. 3). The static-operations cab 32 allows an operator to observe and control the operation of the boom assembly 14 while the utility vehicle 10 is stationary, with the set of outriggers 18 deployed (as discussed in detail below). A mobile operations cab 34 is utilized to drive or otherwise move the base 12 relative to the ground. The proximal end 26 of the boom assembly 14 may further comprise a winch 36 that is associated with a load line (not illustrated). The winch 36 includes a spool 38 and an associated hydraulic motor (not illustrated). The spool 38 includes two end caps 40 and a central section 42. The spool 38 rotates about a horizontal, lateral axis in response to actuation by the hydraulic motor. The load line is wrapped around the central section 42 of the first winch 36 and prevented from falling therefrom by the two end caps 40 of the winch 36.

The base 12 of the utility vehicle 10 is a selectively stabilized platform. In embodiments of the invention, the base 12 is an aerial device base, a crane base, an oilrig, an earth-working machine, an automobile, or a fixed structure. The base 12 provides stability and a counterweight to a load being supported by the boom assembly 14. The base 12 includes a chassis 44, which presents a deck 46 at a deck level. The base 12 may also include one or more bumpers 48. The chassis 44 of the utility vehicle 10 is typically mobile and moves via wheels 50 rotatably secured to the base 12 below deck level.

The base 12 of the utility vehicle 10 utilizes at least one outrigger 18 for stabilization. In embodiments of the invention, such as illustrated in FIGS. 1-3, the outriggers 18 deploy from within, below, or alongside the base 12. The outriggers 18 are configured to be selectively placed into a stowed position (as shown in FIG. 1) and a deployed position (as shown in FIGS. 2-3). When the outriggers 18 are in the stowed position, the utility vehicle 10 is free to maneuver via the wheels 50 because the outriggers 18 are not in contact with the ground. When the outriggers 18 are in the deployed position, the utility vehicle 10 is prevented from maneuver because the outriggers 18 are in contact with the ground. In some embodiments, the outriggers 18 lift the wheel 50 and/or track at least a portion off of the ground. This further prevents movement of the utility vehicle 10 and provides a more stable platform for the task to be performed.

In embodiments of the invention, the base 12 includes a plurality of outriggers 18, such as two, three, four, six, eight, etc. FIGS. 1-3 illustrated an exemplary base 12 with four outriggers 18, a front-left outrigger 52, a front-right outrigger 54, a rear-left outrigger 56, and a rear-right outrigger 58. In embodiments of the invention, the outriggers 18 are deployed from the base 12 in a shape (when viewed from above) that is substantially X-shaped, H-shaped, T-shaped, I-shaped, or other configuration. Relative to a forward driving direction, the outriggers 18 may deploy forward and backward, to the sides, at some intermediate angle therebetween (such as degrees, 45 degrees, 60 degrees relative to the forward/backward direction), etc.

One consideration during the determination of the layout of outriggers 18 relative to the base 12 is the size, shape, and weight distribution of the base 12. For example, if the base 12 is relatively long in the forward direction and relatively thin in the sideways direction, the outriggers 18 may deploy substantially perpendicular to the forward direction (i.e. the sideways direction). This is because the likelihood of the base 12 tipping forward or backward is reduced because of the relative length in the forward direction. A wide base 12 can therefore be achieved via a perpendicular deployment. As another example, if the base 12 is not substantially longer in the forward direction than in the sideways direction, the outriggers 18 may deploy in a diagonal direction relative to the forward direction, in a substantial X-shape when viewed from above. This is because the likelihood of the base 12 tipping forward or backward has not been reduced by the shape of the base 12.

The outrigger 18 will now be discussed in more detail. In embodiments of the invention the outrigger 18 is configured to be installed on and deployed by the utility vehicle 10. In some embodiments, the outriggers 18 are configured to be added to an existing utility vehicle 10. As such, the utility vehicle 10 may be upgraded with the outriggers 18 that include or utilize the chassis-stabilizing system 20 described below. In some embodiments, the outriggers 18 that include or utilize the chassis-stabilizing system 20 are configured to be originally manufactured with the utility vehicle 10.

The outrigger 18 comprises an actuator 60, an outrigger leg 62, an outrigger foot 64, and an outrigger base 66. The outrigger 18 is configured to be disposed into either a stowed position and a deployed position. The outrigger 18 is moved between the stowed position and the deployed position by the actuator 60. In some embodiments, the actuator 60 may operate in response to direct command from the operator, which may instruct or otherwise cause the actuator 60 to elongate or shorten. In other embodiments, the actuator 60 may operate in response to a certain mode or action being selected by the operator (such as preparing to move the boom assembly 14 or preparing to move the utility vehicle 10).

The actuator 60 is secured to the outrigger leg 62, the outrigger foot 64, and/or the outrigger base 66. The actuator 60 is configured to selectively place the outrigger 18 into the stowed configuration and the deployed configuration. Typically, the actuator 60 will shorten to place the outrigger 18 into the stowed configuration and elongate to place the outrigger 18 into the deployed configuration. The actuator 60 pushes and pulls against the outrigger leg 64 relative to the outrigger base 66 and/or the outrigger foot relative to the outrigger leg. In some embodiments, such as illustrated in FIGS. 1 and 2, the outrigger leg includes a horizontal segment 68 and a vertical segment 70 (commonly known as an "out and down" style). In these embodiments, the outriggers 18 may each include two actuators (an "out" actuator" and a "down" actuator), each of which may be at least partially disposed within the respective segments 68, 70. In these embodiments, the below discussed steps may be performed only in regard to the "down" actuator 60, or a combination thereof. In other embodiments, such as illustrated in FIG. 3, the outrigger leg 64 is a single monolithic structure including a single actuator 60.

In embodiments of the invention, the actuator 60 is a hydraulic cylinder. The hydraulic cylinder comprises a rod 72 disposed at least partially within a barrel 74, as illustrated in FIG. 3. The rod 72 includes a piston (not illustrated) fully disposed within the barrel 74. A void (not illustrated) is formed between the piston and the barrel 74 and a cap on the interior side. The hydraulic cylinder is elongated by pumping hydraulic fluid into the void so as to enlarge the void and by extension push the rod 72 and piston relative to the barrel 74. The pumping is performed by a pump via hydraulic lines. In other embodiments, the actuator 60 is a pneumatic cylinder, which uses air or another gas in lieu of the hydraulic fluid. In still other embodiments, the actuator 60 is an electric motor or other type of motor.

The outrigger base 66 is configured to be secured to the chassis 44 of the utility vehicle 10. In some embodiments, the outrigger base 66 is originally manufactured as a component of the chassis 44. In other embodiments, the outrigger base 66 is configured to be added to an existing chassis 44, such as upon an existing deck 46.

In embodiments of the invention, the various components of the outrigger 18 are formed of a metal to provide structural stability and strength. In other embodiments of the invention, the various components of the outrigger 18 are formed of a hardened polymer to provide dielectric qualities to prevent the unintended discharge of electricity through the outrigger 18. In still other embodiments of the invention, some components of the outrigger 18 are formed of metal and other components of the outrigger 18 are formed of a hardened polymer.

It should be appreciated that for purposes of clarity in this description, the ground is presumed to be level and flat. In many instances of practical usage, the ground is not substantially level. Embodiments of the present invention can accommodate un-level and un-even ground angles, such as up to degrees, up to 10 degrees, up to 30 degrees, up to 45 degrees, etc.

The chassis-stabilizing system 20 will now be discussed in more detail. The chassis-levelling system 20 comprises a controller 76 and at least one pressure transducer 78 (as illustrated in FIGS. 2 and 3). The controller 76 is a computing device configured to monitor and control the leveling of the chassis 44. In some embodiments, the controller 76 is a dedicated device. In other embodiments, the controller 76 is the main computer of controlling the operations of the utility vehicle 12. The pressure transducer 78 is disposed at least partially within, adjacent to, or externally to the void within the barrel 74 of the actuator 60. In some embodiments, the pressure transducer 78 is associated with a port (not illustrated) or other existing opening in the barrel 74. In some embodiments, the pressure transducer 78 measures the fluid pressure of the hydraulic fluid within the void. In some embodiments, the pressure transducer 78 takes the form of a load cell and measures strain on the barrel 74 or other component of the actuator 60.

Figure 8:
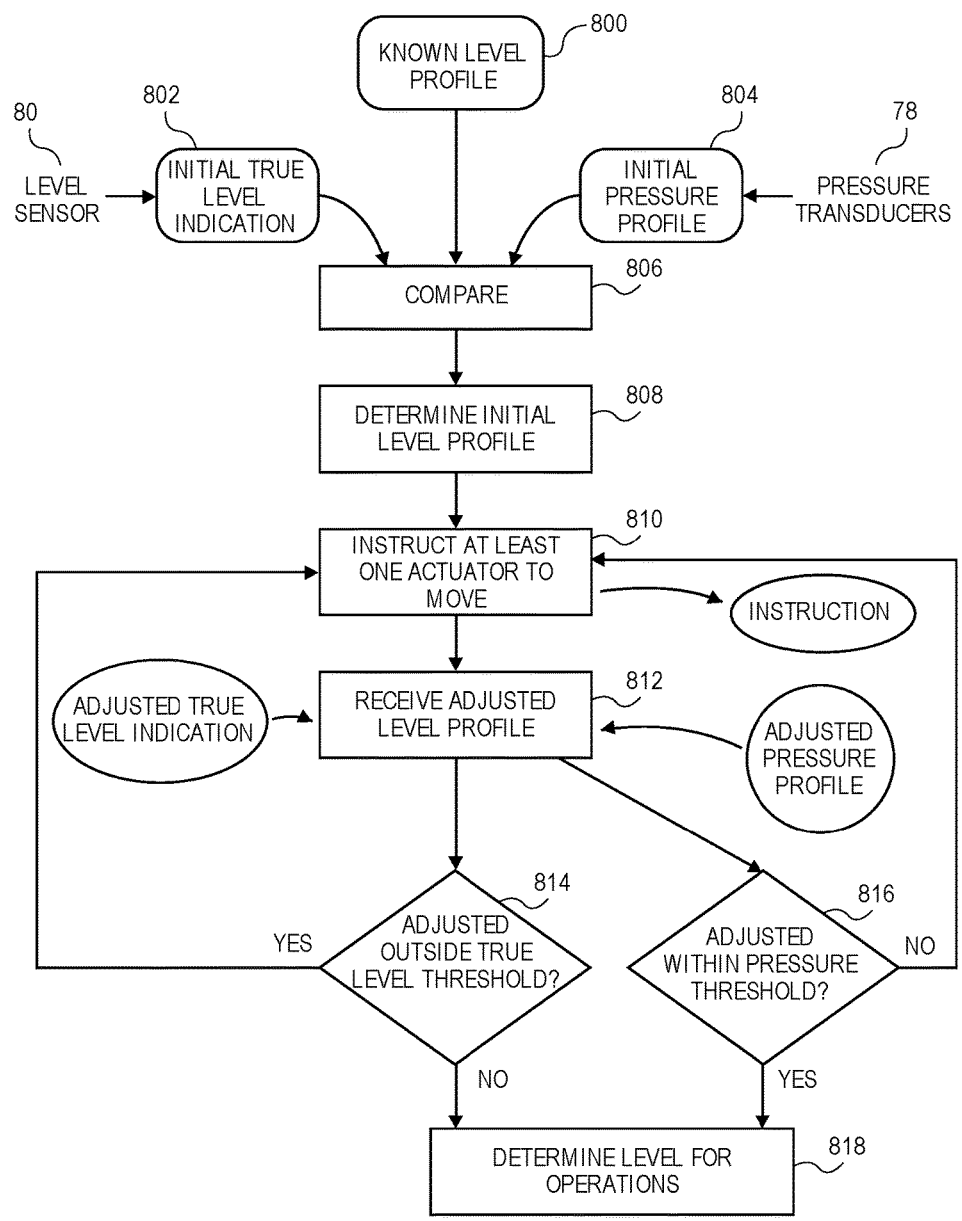
FIG. 8 is a flow diagram illustrating exemplary steps of a method of ensuring the chassis is not outside a true level threshold.

In some embodiments, the chassis-stabilizing system 20 further comprises a level sensor 80, as illustrated in FIGS. 2, 3, and 8. The level sensor 80 is configured to determine a magnitude and/or direction of tipping of the level sensor 80 relative to straight down, an artificial horizon, or other constant. The level sensor 80 is secured (directly or indirectly) to the chassis 44 of the base 12. As such, a tipping of the chassis 44 relative to straight down can be determined and measured by the level sensor 80. The level sensor 80 may be an ultrasonic level sensor, an optical single-point level sensor, a float switch, a capacitive level sensor, a radar level sensor, and/or a conductivity or resistance level sensor.

Figure 4:
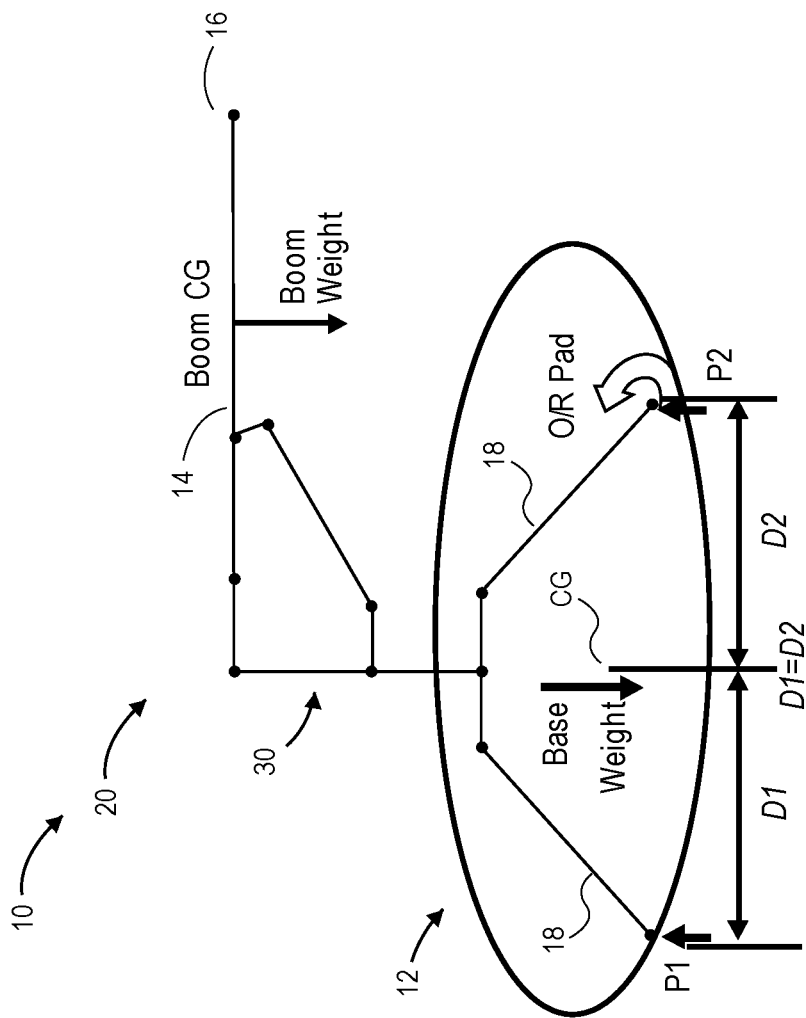
FIG. 4 is a force diagram indicative of a centered configuration in a controlled, neutral environment.
Figure 5:
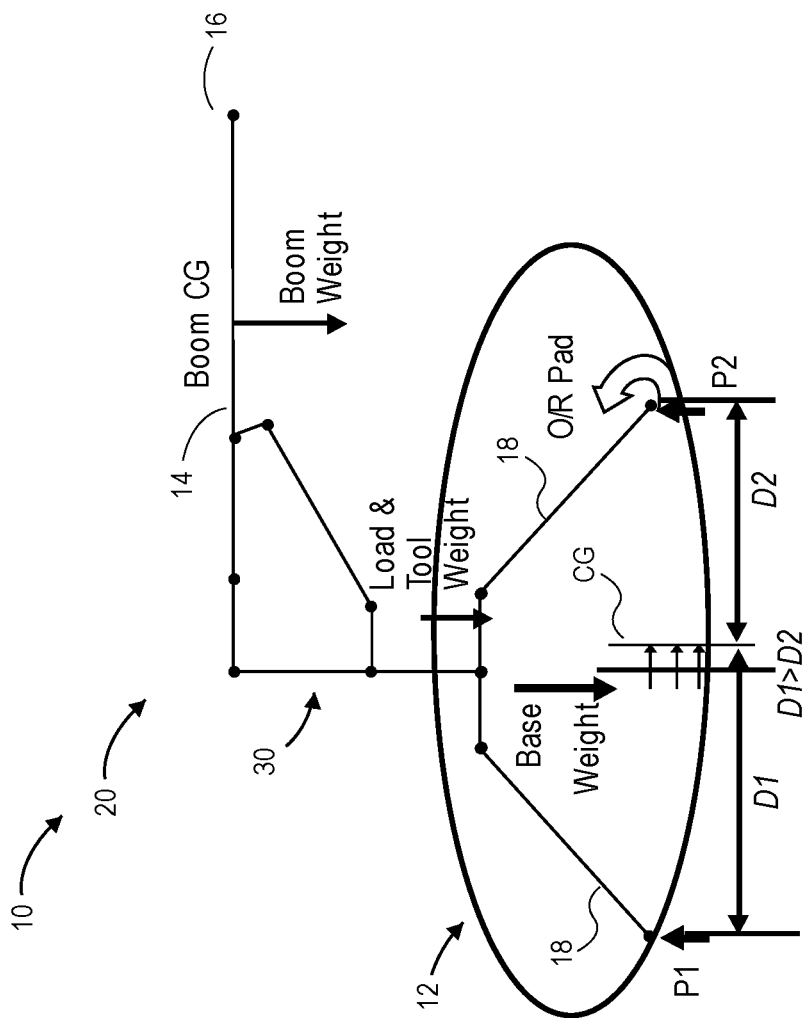
FIG. 5 is a force diagram indicative of a centered configuration in a field environment.
Figure 6:
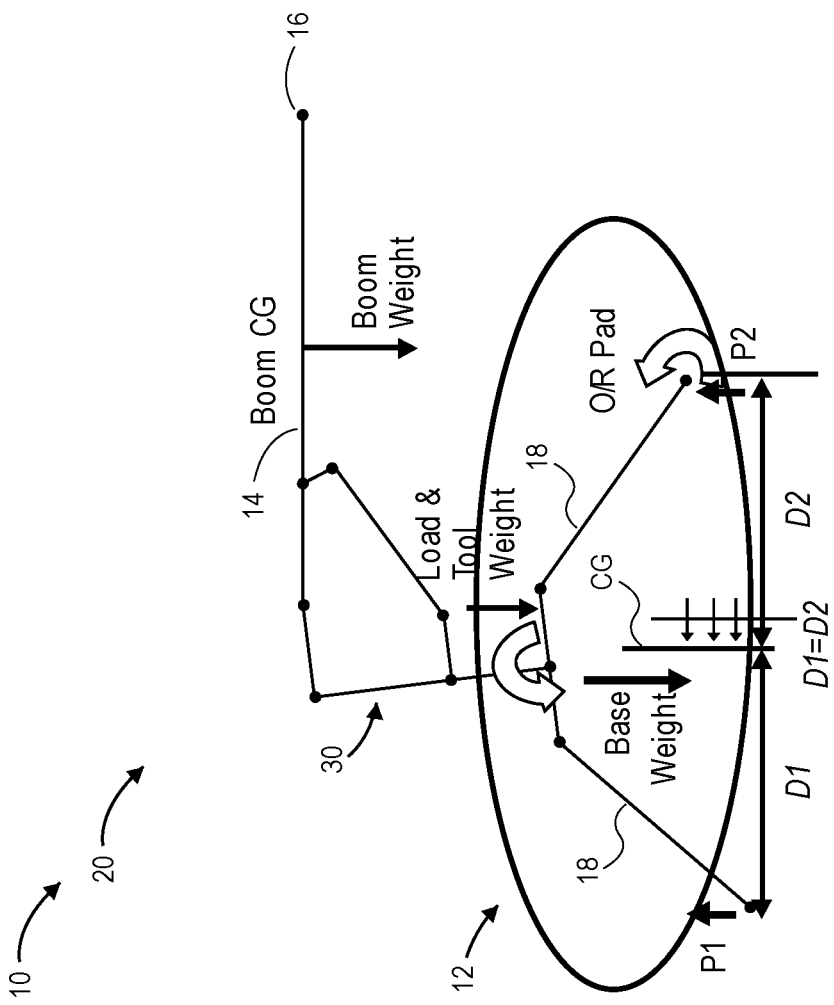
FIG. 6 is a force diagram indicative of a pressure-leveled configuration in a field environment.

Turning to FIGS. 4-6, a general force diagram is shown, illustrating the problem that is solved by some embodiments of the invention. FIG. 4 shows a force diagram indicative of a level configuration in a controlled, neutral environment. FIG. 5 shows a force diagram indicative of a level configuration in a field environment. FIG. 6 shows a force diagram indicative of a pressure-leveled configuration in a field environment. In FIG. 4, the chassis-stabilizing system 20 is both physically level and at a pressurized level. In FIG. 5, the chassis-stabilizing system 20 is physically level, but not pressurized level. In FIG. 6 the chassis-stabilizing system 20 is pressurized level, but not physically level. However, since the chassis-stabilizing system 20 is at a pressurized level in FIG. 6, the chassis-stabilizing system 20 is less susceptible to overturning because the pressures on the chassis-stabilizing system 20 are leveled.

It should be appreciated that, as used herein, "physically level" or "true level" refers to the chassis 44, or some component thereof such as the deck, being physically level relative to a hypothetical horizon, such that the chassis 44 is disposed perpendicular to the weight vector. Similarly, as used herein, "force equalized" refers to the actuators 60 associated with the outriggers 18 being under an expected, standard, proportional, or other similar pressure. A force equalized configuration is used to ensure that even if the chassis 44 is physically level, the chance of an overturning is reduced. In some instances, such as the hypothetical controlled, neutral environment, the chassis 44 may be both physically level and a force equalized configuration. In other instances, achieving a force equalized configuration may require tilting the chassis 44 away from physically level. However, because the pressure is equalized, the force equalized configuration may be more stable than physically level, as long as the chassis 44 is not too far outside of physically level (as discussed more below).

As discussed below, a ratio of the pressure in the outriggers about each axes are maintained within a threshold as the known level profile from the factory. This known level profile is the positioning of the unit such that the center of gravity (CG) of the stowed unit is equally spaced between each outrigger shoe. In the field, the utility vehicle is typically unevenly loaded with tools, equipment, gear, and other loads. This additional load shifts the CG of the truck, changing the distance from the CG to the outrigger shoe, and potentially decreasing the stability of the unit. Even if the utility vehicle 10 was at true level, the system's stability may be reduced because stability is a function of distance from CG to outrigger shoe (shown as D1 and D2 in FIGS. 4-6). The chassis-stabilizing system tilts the utility vehicle 10 in a position such that the equal distance from the CG to the outrigger shoe is revived and full stability is maintained in all or some rotation positions.

In some embodiments, the known level profile is recorded, adjusted, and/or fixed while the boom assembly 14 is stowed. Then the base 12 is locked in while the boom assembly 14 is moving relative to the base 12. In these embodiments, the chassis-stabilizing system 20 may not monitor the pressure ratios while the boom is moving and may not use that information to change the outrigger position. Instead, in these embodiments, stability while the boom assembly 14 is in the air performed observing a change in tilt angle of the boom assembly 14 and/or observing a change in pressure However, it should be noted that the change in pressure may not be directly correlated, as it may require more information about boom motions, load applied, etc.

In other embodiments, the chassis-stabilizing system 20 is an active outrigger system that operates at least partially while the boom assembly 14 is in the air. In these embodiments, the chassis-stabilizing system 20 continues to adjust the physical level of the base 12 to keep the overall utility vehicle 10 stable.

In each of FIGS. 4-6, the following components of the chassis-stabilizing system 20 are illustrated. The base 12 and associated outriggers 18 are illustrated (two in this simplified illustration). The boom turret 30 (also known as a "turntable") is illustrated atop the base 12. The boom assembly 14 extends diagonally upward from the boom turret 30 about a pivot. The following forces are acting on the chassis-stabilizing system 20. The base weight and the boom weight are pressing downward. The outrigger pads (and by extension the actuators 60) provide an upward force. In FIGS. 5 and 6, tools and/or a load exert a downward force from the distal end 28 of the boom assembly 14.

FIG. 4 shows a force diagram indicative of a configuration where the center of gravity ("CG," which may also be known as a center of mass) is equally spaced ("D1=D2") between each outrigger shoe in a controlled, neutral environment (which may be known as a stable configuration, a force-equalized configuration, or the like). An example of a controlled, neutral environment may be in a factory that is manufacturing the chassis-stabilizing system 20. Another example may be in a repair facility or other headquarters location of the operator of the chassis-stabilizing system 20. The controlled, neutral environment may have a hard, flat floor, and the chassis-stabilizing system 20 may be free of additional tools, implements 16, loads, people, and other objects that may otherwise be on or associated with the chassis-stabilizing system 20 (such as in the field environment discussed below). In these controlled, neutral environments, pressure levels that are specific to that system may be correlated with the physically level reading, or other standard level reading. This is because in the controlled, neutral environment, these optimal pressures for physically leveling the chassis 44 can be determined through experimentation, computer modeling, interpolation/extrapolation, and other methods. In FIG. 4, the chassis-stabilizing system 20 is shown as both physically level and at a pressurized level. The pressurized level in the controlled, neutral environment is referred to herein as the "known level profile." The known level profile includes information indicative of a pressure that is expected for one or more outrigger 18 actuators 60.

Shown in FIG. 4 is the horizontal distance (D1 and D2) between the center of gravity and the outrigger shoe. The horizontal distance terminates at a hypothetical tipping line, which is imaginary line around which the utility vehicle would rotate in 3D space, drawn between two outrigger shoes, so in this figure it is not directly shown and instead goes "into the page" to the other outrigger not drawn. The horizontal distance is the hypothetical separation between the downward force of a total weight at center of gravity (being a combination of the base weight and the boom weight) and the upward force of the outrigger pads. If the total weight downward force moves beyond the outrigger pad, the chassis 44 will overturn about the tipping line. This can have catastrophic results for the utility workers, the load, and the chassis 44. In the controlled environment, the center of gravity is substantially centered on the chassis 44.

FIG. 5 shows a force diagram indicative of a level configuration in a field environment. An example of a field environment may be a job site or other location where the task is being performed. While many tasks may be performed in a controlled, neutral environment, the chassis-stabilizing system 20 is configured to perform tasks in a field environment and as such compensates for the various conditions found therein. For example, in the field environment the chassis-stabilizing system 20 may include additional or different tools or implements 16, such as those specific for the task or tasks to be performed (such as a digger derrick or a utility platform). Similarly, a specific load may be present (such as a repair part to be lifted or a utility pole to be emplaced). These parts and/or equipment are shown offset from the centerline of the utility vehicle 10 and therefore shift the center of gravity of the utility vehicle 10 away from the centerline. In FIG. 5, the chassis-stabilizing system 20 is physically level, but not pressurized level. It should be appreciated that in numerous prior art systems, the chassis-stabilizing system 20 would be operated in this configuration.

Shown in FIG. 5, the location of the center of gravity is moved toward the outrigger pad (e.g., D2>D1). This is, for example, because the weight of the cargo or equipment in the bed area of the truck has increased but was loaded unevenly; because the weight of the boom assembly 14 has increased due to the addition of a tool, implement 16, or load to the distal end 28 of the boom assembly 14; or some other reason. Moving the location of the center of gravity toward the outrigger pad decreases the horizontal distance between the center of gravity and the outrigger pad and makes the chassis more likely to overturn.

FIG. 6 shows a force diagram indicative of a pressure-leveled configuration in a field environment. In FIG. 6 the chassis-stabilizing system 20 is pressurized level, but not physically level. However, since the chassis-stabilizing system 20 is at a pressurized level in FIG. 6, the chassis-stabilizing system 20 is less susceptible to overturning because the horizontal distance (D1, D2) between the CG and the outrigger pad has been maintained, or returned to the configuration shown in FIG. 4. Shown in FIG. 6, the center of gravity has returned to the approximate original position from FIG. 4, despite still being under the load shown in FIG. 5. This allows the chassis-stabilizing system 20 to have the stability of the controlled, neutral environment even when in field environments. It should be appreciated that FIG. 6 is shown an at exaggerated angle for clarity to the viewer. Instances of this correction may be less than one degree, less than five degrees, less than ten degrees, or some other range. Excessive correction may cause other structure stability problems that would counteract the benefits discussed herein.

Figure 7:
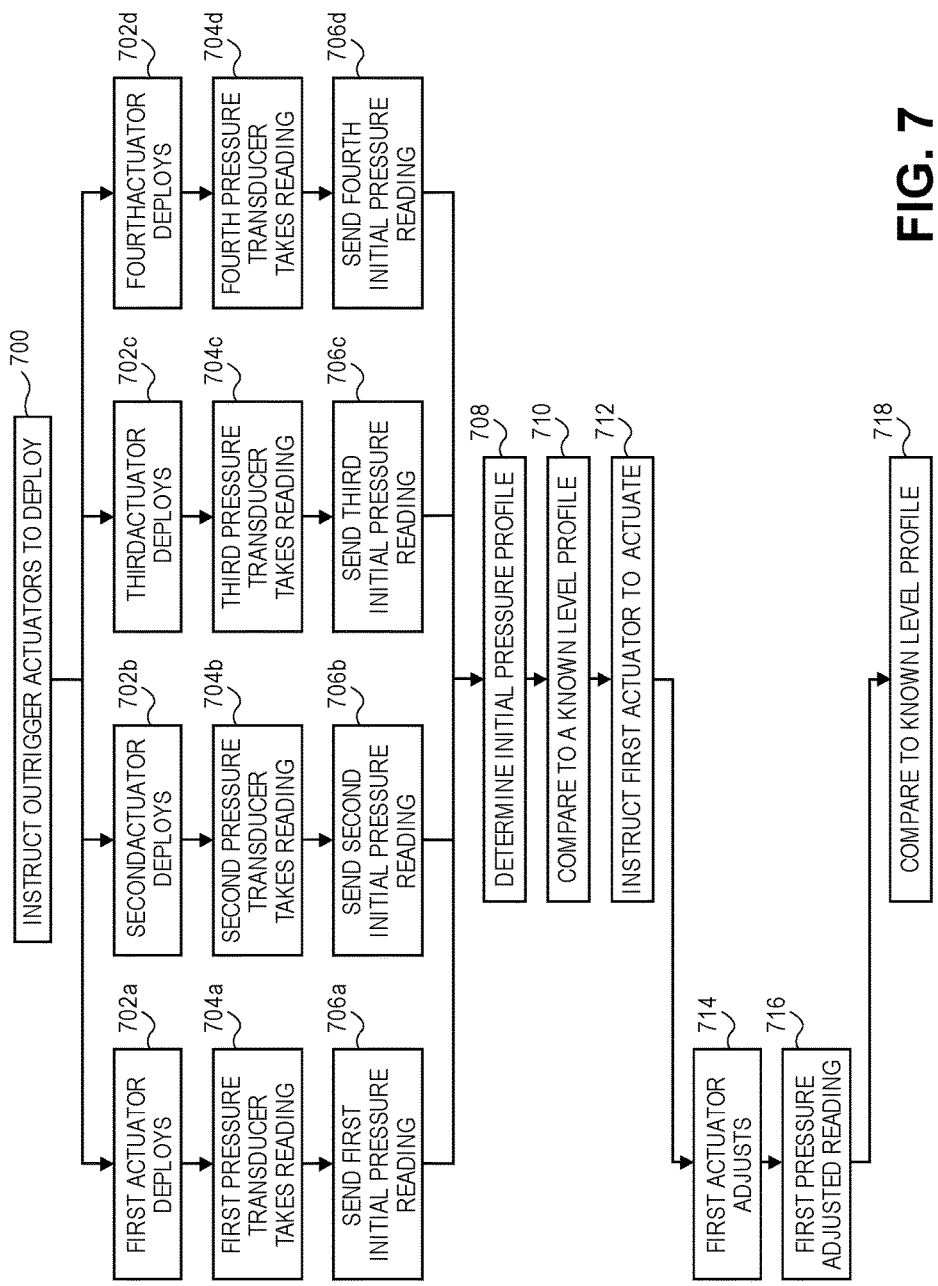
FIG. 7 is a flow diagram illustrating exemplary steps of a method of adjusting a chassis toward a force equalized configuration.

Turning to FIG. 7, an exemplary method of controlling the actuators 60 is shown and described. In embodiments of the invention, at least a portion of the described method is performed at least in part by a controller 76. The controller 76 is a computing device or a processor that controls the deployment of the actuators 60 and/or other general setup of the chassis-stabilizing system 20. In the example of FIG. 7, these steps performed by the controller 76 are illustrated as centered. In embodiments of the invention, some steps are performed by the actuator 60, a microcontroller associated with the actuator 60, a microcontroller associated with the pressure reading, or other distributed component. These distributed components may be at each or any of the outriggers 18. In the example of FIG. 7, these steps performed by the distributed components are illustrated in the four columns.

In Step 700, the controller 76 instructs the actuators 60 to deploy. The instruction may be provided digitally, electronically, mechanically, hydraulically, pneumatically, or other instruction media. For example, the controller 76 may instruct a valve associated with each actuator 60 to open so as to allow pressurize hydraulic fluid to flow into and thus actuate the actuator 60. Prior to this step, the outriggers 18 may have been in a stowed position (as illustrated in FIG. 1), such as during transportation to the work site. The deploying outrigger 18 may move from the stowed position to the deployed position (as shown in FIGS. 2 and 3).

In Steps 702a-d, each respective actuator 60 deploys. The elongation of the actuator 60 causes the outrigger 18 to move to the deployed position. The elongation may stop upon the actuator 60 reaching a maximum elongation, proper emplacement being detected, the base 12 lifting off the underlying surface, or other indication.

In Step 704a-d, each respective pressure transducer 78 within or otherwise associated with the actuator 60 takes a reading. The reading may be a single discreet reading, may be a periodic reading, or may be a continuous reading. In some embodiments, the single reading is provided upon the actuator 60 being fully deployed. In some embodiments, the single reading is provided upon request from the controller 76.

In Step 706a-d, each initial pressure reading is sent to the controller 76. The pressure transducer 78 reading may be an electrical signal, a digital signal, an analog signal, a mechanical signal, or other signal. The signal may be sent upon request of the controller 76, upon completed deployment of the outriggers 18, upon a certain interval, upon the reading reaching a certain threshold, or other condition precedent.

In Step 708, the controller 76 determines an initial pressure profile. The pressure profile is indicative of the pressure levels in at least one of the actuators 60, which may include all of the actuators 60. The initial pressure profile may include other information such as temperature information, angle of emplacement information, and other information related to the outriggers 18 and/or the stability thereof. It should be appreciated that "initial" as used herein may refer to the first pressure profile created upon deployment, or may refer to any other pressure profile that may be used in subsequent iterations of the method. These steps may be performed during worksite setup before using moving the boom assembly 14 out of the stowed position, periodically, upon a specific instruction by the utility worker, or at other times.

In Step 710, the controller 76 compares the initial pressure profile to a known level profile. The comparison may be performed by comparing individual pressure reading between the initial pressure profile and the known level profile and/or comparing the ratios thereof because of changes in loading from gear and/or equipment on the utility vehicle 10. The comparison may additionally or alternatively be performed by comparing a ratio or proportionality of the individual pressure readings and the known level profile. For various reasons, the pressure in any given actuator 60 may be different in the controlled environment and the field environment. A force equalized configuration stability may therefore be achieved by ensuring that the proportion or ratio of the pressures in the pressure profile closely approximates the known level profile.

The known level profile is generated in or otherwise associated with the neutral, controlled environment, such as shown in FIG. 4. The known level profile includes expected pressures that correspond with the actuators 60. For example, the known level profile may be generated during initial manufacture of the chassis-stabilizing system 20. The known level profile may be specific to the particular utility vehicle 10, or may be standard for all utility vehicles 10 of a certain type or model. Because the utility vehicle 10 is not evenly distributed by weights and locations, the pressure within the actuator 60 may be unevenly distributed between the actuators 60, which may also be attributed to manufacturing tolerance, hydraulic inefficiencies, and friction effects. The field environment pressures vary from the controlled environment pressures because the trucks are loaded with various pieces of gear and equipment in the field In Step 712, the controller 76 instructs the first actuator 60 to actuate. It should be appreciated that instructing the first actuator 60 to actuate is only exemplary. In various instances, the controller 76 may instruct any or all of the actuators 60 to actuate. The instruction may include an amount to increase or decrease the actuation, a target pressure, a target overall length, or other indication of an amount to which the actuator 60 should actuate. It should be appreciated that in many instances, these adjustment actuations will be relatively minor.

In Step 714, the first actuator 60 adjusts the pressure as instructed by the controller 76. In Step 716, the first pressure transducer takes an adjusted pressure reading. It should also be appreciated that the other pressure transducers may also send an adjusted pressure reading. This is because the change in pressure in the first actuator 60 may affect the pressures in the other actuators 60. In Step 718, the controller 76 compares the adjusted pressure profile to the known level profile, as described above. Typically, following the actuation, the adjusted pressure profile will be proportionally closer or have a reduced experimental error compared to the initial pressure profile. The above discussed steps may then be repeated, in whole or in part, to further adjust the pressure profile.

Moving to FIG. 8, a method of comparing the above discussed pressure equalization with a true level measurement is discussed. The steps discussed herein may be performed in addition to, in conjunction with, or alternatively to the steps discussed in regard to FIG. 7. The steps of FIG. 8 utilize a level sensor 80. The level sensor 80 may be disposed on or otherwise associated with the chassis 44 of the utility vehicle 10. The level sensor 80 may be co-located with the controller 76 or other computing device.

In Step 800, a known level profile is accessed, acquired, entered, or otherwise received. In Step 802, an initial true level indication is received from a level sensor 80. The initial true level indication is provided by the level sensor 80 determining a degree, amount, magnitude, and/or direction that the chassis 44 is disposed relative to straight down (e.g., with respect to the horizon). In Step 804, the initial pressure profile (or the individual pressure readings that are associated with the initial pressure profile) are received from the pressure transducers 78, as discussed above.

In Step 806, this information is compared. The initial pressure profile is compared to the known level profile, as discussed above. Additionally, the initial pressure profile is compared to the initial true level indication. As such, a correlation between the initial pressure profile and true level can be determined. In some embodiments, the instruction to deploy the actuators 60 is associated with the level sensor 80. In these embodiments, the deploying of the actuators 60 is performed until the chassis 44 of the utility vehicle 10 is raised off the ground a certain distance and the chassis 44 is level (as indicated by the level sensor 80). In these embodiments, the initial true level indication will be at or near fully level.

In Step 808, the chassis-stabilizing system 20 determines an initial level profile. The initial level profile is based in part on the comparison described above. Based upon the initial level profile, the chassis-stabilizing system 20 will determine which, if any, actuators 60 need to be adjusted to improve the initial level profile. Improving the initial level profile can include moving the initial pressure profile closer to the known level profile without exceeding too much adjustment in the initial true level indication. The amount to which exceeding the initial true level indication is safe may be variable or fixed, as discussed below.

In Step 810, the chassis-stabilizing system 20 instructs at least one actuator 60 to move. This instruction is sent to the at least one actuator 60, to at least one valve, to a microcontroller, or other structure configured to actuate the actuator 60. In Step 812, the chassis-stabilizing system 20 receives or determines an adjusted level profile, based at least in part on an adjusted pressure profile from the pressure transducers and an adjusted true level indication from the level sensor 80.

In Steps 814 and 816, the chassis-stabilizing system 20 analyzes the adjusted level profile to determine if the chassis-stabilizing system 20 is level for operations (e.g., sufficiently level and stable to begin or continue operations). It should be appreciated that Step 814 and Step 816 may be performed simultaneously or as a single step. It should also be appreciated that similar steps to Step 814 and Step 816 may also be performed prior to Step 810 to determine if the initial level profile is level for operations, which are not illustrated for simplicity.

In Step 814, the chassis-stabilizing system 20 determines if the adjusted level profile is outside a true level threshold. The true level threshold is an amount to which the chassis 44 may be tipped away from true level while operating safely. As discussed above, operating away from true level can be advantageous as the pressures are closer to the known level profile. However, being too far away from level can also present problems with stability, for example If the position exceeds the operational slope limits of the structure. Moving away from true level is beneficial if known level profile is reaching within unit operating limits. By achieving known level, the stability capabilities of the unit are balanced for all positions around the truck.

In some embodiments, the true level threshold may be static for all systems of a certain model, type, or configuration. This static true level threshold may be experimentally and/or computationally derived, taking into account safety factors, material differences, accessory differences, and the like. In some embodiments, the true level threshold may be static for a specific utility vehicle 10. As discussed above, the known level profile can be derived during assembly, manufacture, repair, or other operation in the controlled environment. The derivation of the known level profile may also include derivation of the true level threshold. This true level threshold can then remain static and may be associated with the known level profile. In some embodiments, the true level threshold is variable based upon various sensor readings and other situations. For example, the true level threshold may be lower if the pressure profile is significantly above the known level profile. As another example, the true level threshold may be larger depending on the solidity of the surfaces upon which the outrigger pad rests.

It should also be appreciated that in some embodiments the true level threshold varies on the direction of the tipping away from true level, in addition to the magnitude of the tipping away from true level. For example, the chassis 44 may be able to withstand greater tipping in a longitudinal direction than in a lateral direction. As such the true level threshold may include a range of thresholds depending on the direction of the tipping away from true level.

In Step 816, the chassis-stabilizing system 20 determines is the updated level profile is close enough to the known level profile. This process is similar to as described above in regard to Step 718. The chassis-stabilizing system 20 may attempt to replicate, approximate, or approach the known level profile (either directly or proportionally).

In Step 818, upon a determination that the chassis-stabilizing system 20 is not outside the true level threshold and is sufficiently close to the known level profile, the chassis-stabilizing system 20 will determine that the chassis 44 is leveled for operations to begin or continue. This may trigger an interlock that allows the operation of the boom assembly 14 to begin or continue.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A chassis-stabilizing system comprising:
a first actuator associated with a first pressure transducer,
wherein the first actuator is configured to move a first outrigger of a chassis;
a second actuator associated with a second pressure transducer,
wherein the second actuator is configured to move a second outrigger of the chassis; and
a controller configured to—
receive a first initial reading from the first pressure transducer and a second initial reading from the second pressure transducer;
determine an initial pressure profile based at least in part on the first initial reading and the second initial reading;
compare the initial pressure profile to a known level profile;
instruct the first actuator to actuate so as to adjust the initial pressure profile to proportionally nearer to the known level profile;
acquire, from a level sensor, an initial true level indication associated with the initial pressure profile; and
acquire, from the level sensor, an adjusted true level indication associated with the adjusted pressure profile.

2. The chassis-stabilizing system of claim 1, wherein the known level profile is determined in a controlled environment absent a load.

3. The chassis-stabilizing system of claim 2, wherein the known level profile is constant for the chassis-stabilizing system.

4. The chassis-stabilizing system of claim 1,
wherein, following said actuation by the first actuator, the chassis is substantially away from a true level and nearer to a pressurized level,
wherein pressurized level is defined as an adjusted pressure profile being proportionally nearer to the known level profile.

5. The chassis-stabilizing system of claim 1, wherein the controller is further configured to:
determine whether the adjusted true level indication is outside a true level threshold range; and
instruct, upon determining whether the adjusted true level indication is outside the true level threshold range, the first actuator to actuate.

6. The chassis-stabilizing system of claim 1, further comprising:
a third actuator associated with a third pressure transducer,
wherein the third actuator is configured to move a third outrigger of the chassis; and
a fourth actuator associated with a fourth pressure transducer,
wherein the fourth actuator is configured to move a fourth outrigger of the chassis.

7. The chassis-stabilizing system of claim 6, wherein the initial pressure profile is further based on a third initial pressure reading from the third pressure transducer and a fourth initial pressure reading from the fourth pressure transducer.

8. A chassis-stabilizing system comprising:
a first pressure transducer associated with a first actuator,
wherein the first actuator is configured to move a first outrigger of a chassis;
a second pressure transducer associated with a second actuator,
wherein the second actuator is configured to move a second outrigger of the chassis;
a controller configured to—
receive a first initial reading from the first pressure transducer and a second initial reading from the second pressure transducer;
determine an initial pressure profile based at least in part on the first initial reading and the second initial reading;
compare the initial pressure profile to a known level profile;
instruct the first actuator to actuate so as to adjust the initial pressure profile to proportionally nearer to the known level profile,
receive a first adjusted reading from the first pressure transducer;
determine an adjusted pressure profile based at least in part on the first adjusted reading; and
compare the adjusted pressure profile to the known level profile to determine that the adjusted pressure profile is nearer to the known level profile than the initial pressure profile,
wherein, following said actuation by the first actuator, the chassis is substantially away from a true level and nearer to a pressurized level,
wherein pressurized level is defined as the adjusted pressure profile being proportionally nearer to the known level profile.

9. The chassis-stabilizing system of claim 8, wherein the known level profile is determined in a controlled environment absent a load.

10. The chassis-stabilizing system of claim 9, wherein the known level profile is constant for the chassis-stabilizing system.

11. The chassis-stabilizing system of claim 8, further comprising:
a third actuator associated with a third pressure transducer,
wherein the third actuator is configured to move a third outrigger of the chassis; and
a fourth actuator associated with a fourth pressure transducer,
wherein the fourth actuator is configured to move a fourth outrigger of the chassis,
wherein the initial pressure ratio is further based on a third initial pressure reading from the third pressure transducer and a fourth initial pressure reading from the fourth pressure transducer.

12. A chassis-stabilizing system comprising:
a first pressure transducer associated with a first actuator,
wherein the first actuator is configured to move a first outrigger of a chassis;
a second pressure transducer associated with a second actuator,
wherein the second actuator is configured to move a second outrigger of the chassis;
a level sensor; and
a controller configured to— receive a first initial reading from the first pressure transducer and a second initial reading from the second pressure transducer;

determine an initial pressure profile based at least in part on the first initial reading and the second initial reading;

compare the initial pressure profile to a known level profile;

instruct the first actuator to actuate so as to adjust the initial pressure profile to proportionally nearer to the known level profile;

acquiring, from the level sensor, an adjusted true level indication associated with the adjusted pressure profile; and determining whether the adjusted true level indication is above a true level threshold.

13. The chassis-stabilizing system of claim 12, wherein the known level profile is determined in a controlled environment absent a load.

14. The chassis-stabilizing system of claim 13, wherein the known level profile is constant for the chassis-stabilizing system.

15. The chassis-stabilizing system of claim 12, wherein, following said actuation by the first actuator, the chassis is substantially away from a true level and nearer to a pressurized level, wherein pressurized level is defined as an adjusted pressure profile being proportionally nearer to the known level profile.

16. The chassis-stabilizing system of claim 12, wherein the controller is further configured to:

instruct, upon determining whether the adjusted true level indication is outside a true level threshold, the first actuator to actuate.

17. The chassis-stabilizing system of claim 12, further comprising:

a third actuator associated with a third pressure transducer, wherein the third actuator is configured to move a third outrigger of the chassis; and a fourth actuator associated with a fourth pressure transducer, wherein the fourth actuator is configured to move a fourth outrigger of the chassis, wherein the initial pressure ratio is further based on a third initial pressure reading from the third pressure transducer and a fourth initial pressure reading from the fourth pressure transducer.

18. The chassis-stabilizing system of claim 12, wherein the controller is further configured to:

receive a first adjusted reading from the first pressure transducer, determine an adjusted pressure profile based at least in part on the first adjusted reading; and compare the adjusted pressure profile to the known level profile to determine that the adjusted pressure profile is nearer to the known level profile than the initial pressure profile.

* * * * *